United States Patent [19]
Dewing

[11] Patent Number: 5,209,186
[45] Date of Patent: May 11, 1993

[54] ANIMAL BEDDING NODULES MODE FROM PAPER PULP AND METHOD OF MAKING THE SAME

[75] Inventor: Kenneth M. Dewing, Porterville, Calif.

[73] Assignee: Endurequest Corporation, Porterville, Calif.

[21] Appl. No.: 832,782

[22] Filed: Feb. 7, 1992

[51] Int. Cl.⁵ ............................................. A01K 1/015
[52] U.S. Cl. .................................... 119/172; 264/118; 264/140
[58] Field of Search ....................... 119/171, 172, 173; 264/118, 140, 109, 86, 117

[56] References Cited

U.S. PATENT DOCUMENTS 4,560,527 12/1985 Harke et al. ............................ 119/172
4,619,862 10/1986 Sokolowski et al. .................. 119/172

Primary Examiner—John G. Weiss
Attorney, Agent, or Firm—Christie, Parker & Hale

[57] ABSTRACT

Described herein is a method of producing nodules from paper pulp. The method includes partially dewatering the paper pulp and tumbling the partially dewatered pulp in an externally heated enclosure until the nodules are formed. Additives may be added to the pulp prior to tumbling.

12 Claims, 2 Drawing Sheets

WET                    DRY

WET                                                    DRY

ANIMAL BEDDING NODULES MODE FROM PAPER PULP AND METHOD OF MAKING THE SAME

BACKGROUND OF THE INVENTION

Many materials have been used as bedding material for animals. Straw is commonly used as bedding material for horses and other domestic animals. However, other materials such as sawdust, wood shavings, rice hulls and sugar cane have been used to a limited extent.

It has also been suggested to utilize shredded waste paper, e.g. old newspapers, for horse stall bedding. The advantages of using shredded waste paper are that waste paper material is used which would otherwise have to be discarded or recycled and old newspapers are inexpensive. However, shredded waste paper is generally undesirable for bedding material because it tends to mat and poses a disposal problem. Therefore, straw has remained the preferred bedding material because of its historical use for this purpose and its low cost.

The characteristics which are important for a satisfactory bedding material for animals, include absorbency, cleanliness, and appearance. In addition, such materials should be nontoxic and dust and lint free, as well as easy to handle. The ability to easily remove the bedding material after use is also important. Furthermore, so as to avoid creating another environmental or disposal problem, a preferred bedding material should be able to be composted and be decomposable. Acceptable appearance prior to the decomposition and acceptable odor characteristics are also desirable.

U.S. Pat. No. 4,305,345 Otogurro and U.S. Pat. No. 4,560,527 to Harke, et al. each incorporated herein by reference describe techniques for making kitty litter sized particles from cellulosic materials (paper fibers) while U.S. Pat. No. 4,931,139 to Phillips also incorporated herein by reference describes a latex bound absorbent material also made from fibers.

SUMMARY OF THE INVENTION

The present invention relates to nodules of cellulose material made from paper pulp and, more particularly, from paper pulp produced from waste paper which are uniquely formed into nodules f a size suitable for animal bedding. As referred to herein, the term "pulp" or "paper pulp" is used to refer broadly refer to processed cellulosic fibers which may include a pulpy mass of pulp produced by digestion or dissolution of paper and paper products. Still more particularly, the invention relates to a novel paper fiber nodule animal bedding material and its method of preparation.

In accordance with the invention the method of producing nodules from paper pulp comprises providing a mass of paper pulp, preferably of a dry fiber content of partially dewatering the paper pulp by weight to increase its dry fiber weight preferably form and thereafter tumbling the partially dewatered paper pulp in an externally heated enclosure preferably an inclined rotary drum to form from the paper pulp a plurality of discreet nodules, the majority of which ie about 75% or more are at a particle size of about 0.3 to about 1 inch in major dimension. Dry fiber content is preferably from about 15 to about 30 percent by weight. The nodules are then dried, preferably by passing air through and over the nodules to a dry fiber content in excess of 90% by weight having a bulk density of from about 10 to about 15 lbs/cu.ft. preferably about 11.5 to about 12.5 lbs. 1 cu.ft. By practicing the method of the invention, cellulosic nodules may be produced which have a smooth, hard surface but porous and which retain the nodular character and resist breaking during subsequent use and handling. Moreover they can absorb water in an amount of at 4 or more times their dry fiber more usually 5 to 6 times their dry weight without change in their nodular character.

In a preferred embodiment, the nodules are produced by providing a mass of paper pulp and, which is first partially dewatered to increase the dry fiber weight, and after partial dewatering, the paper pulp is passed through an inclined, rotating, externally heated drum equipped with baffles, fingers, or the like on the interior surface to pick up the nodules as they are formed and impact then against the heated interior surface of the drum as the drum rotates. This action causes the nodules to form with some attendant loss of water. Rolling forms a smooth hardened surface or skin on the nodules which allows the nodules to retain their discreet character and shape and resist breaking when dry and yet open to absorption of substantial amounts of moisture without loss of nodule integrity.

THE DRAWING

Figure 3:
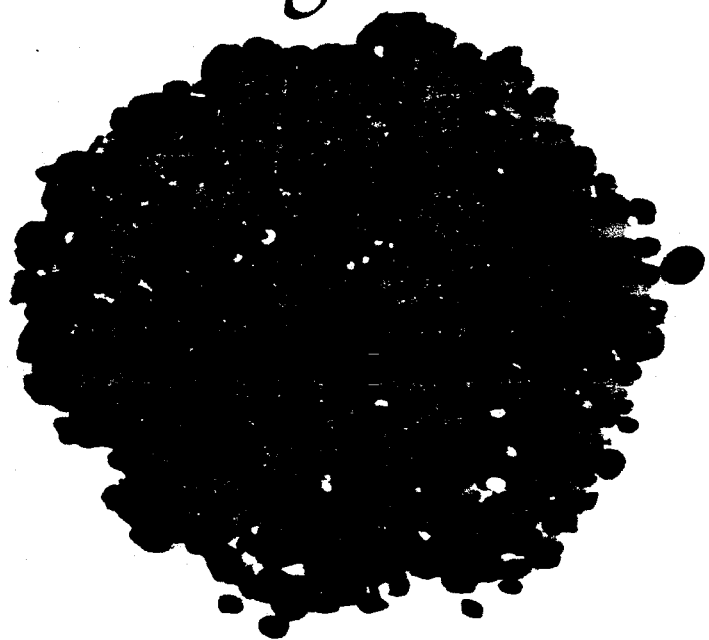

FIG. 3 shows actual size kitty litter in a flattened shape understood to be produced according to U.S. Pat. No. 4,560,527 incorporated herein by reference.

Figure 4:
Figure 4:
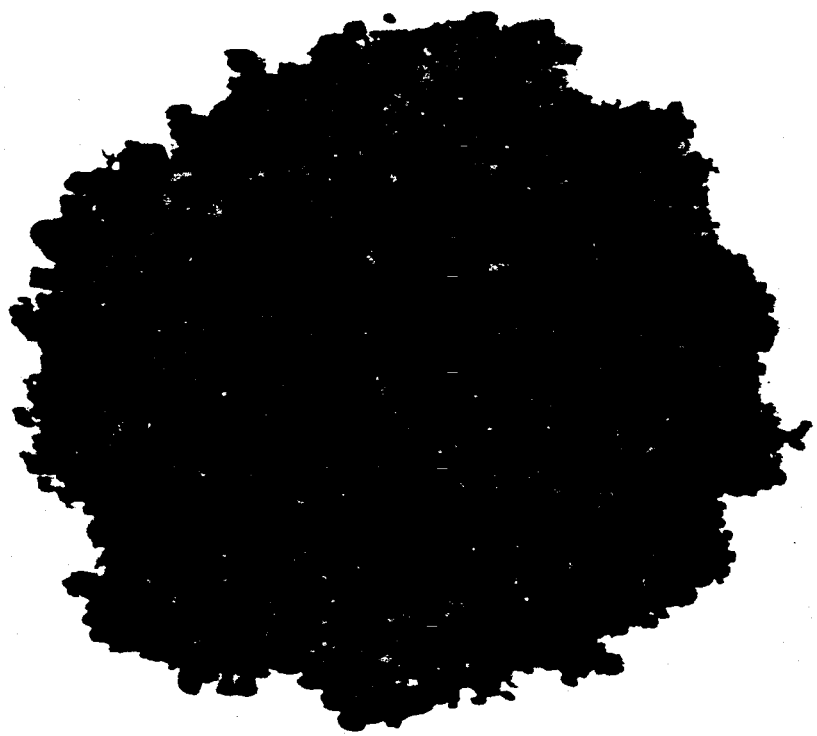
Figure 1:
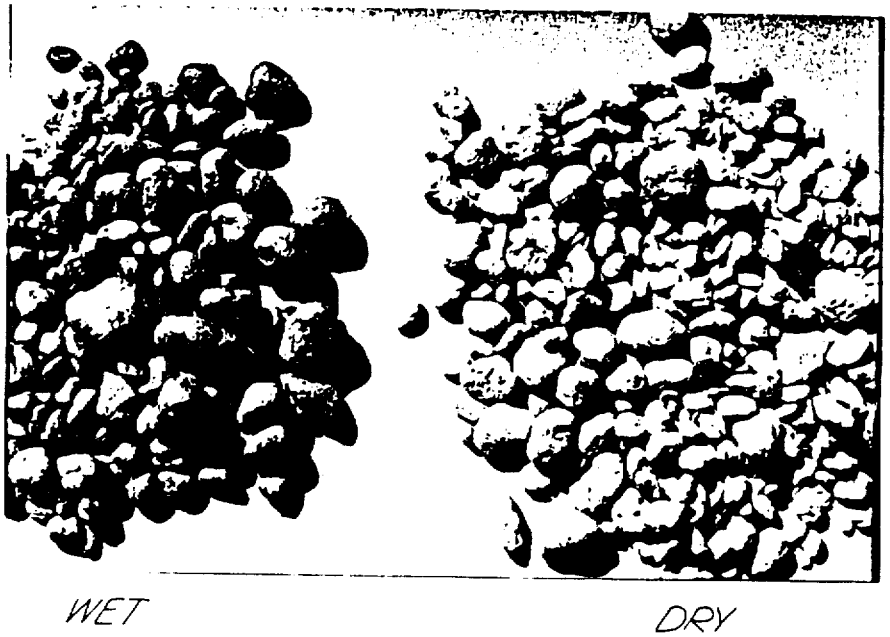
Figure 2:
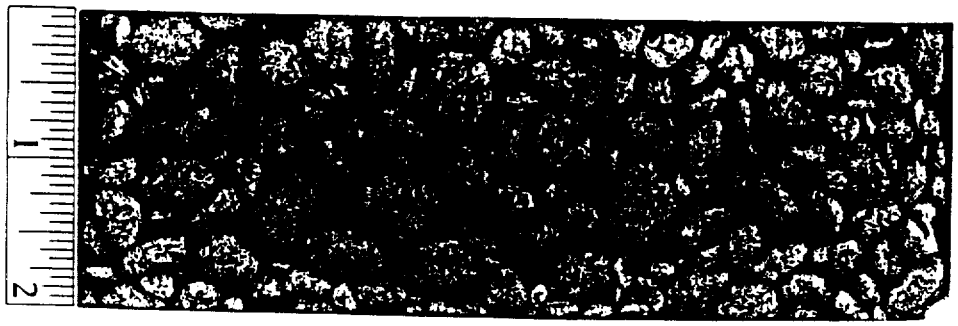
Figure 3:
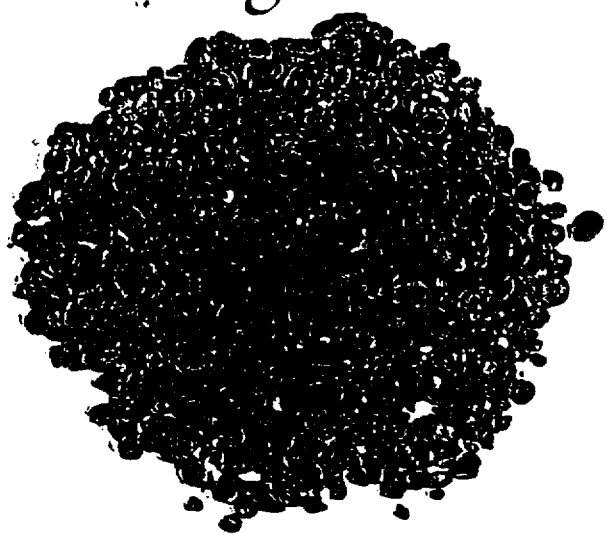
Figure 4:
Figure 4:
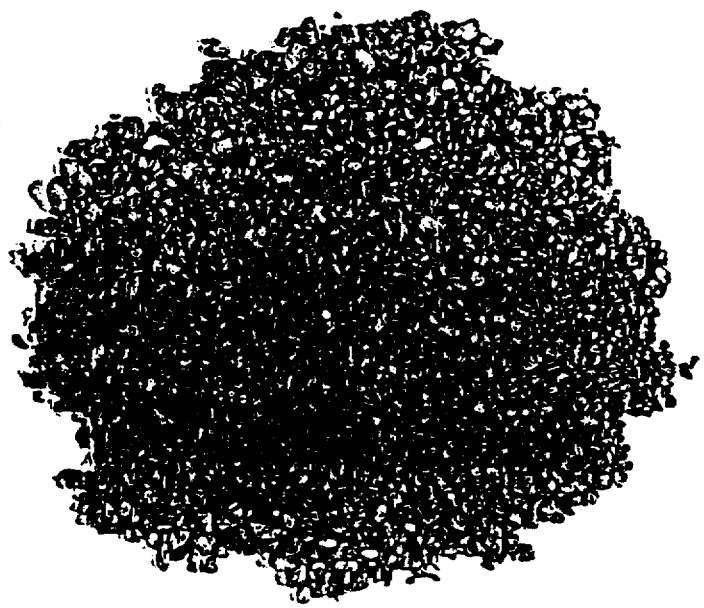

FIG. 4 shows actual size kitty litter produced from cellulosic fibers by another process and supplied by Golden Cat Corporation.

DETAILED DESCRIPTION OF PREFERRED EMBODIMENTS

Starting material for the preparing the bedding nodules of the invention is a paper pulp slurry which may be obtained by any suitable and well known means. Paper is generally recognized as a product made by chemically processing cellulosic fibers. Many different sources have been used for making paper, but the largest quantity of paper is made from soft woods such as spruce, hemlock, pine, etc. Paper has also been made from synthetic fiber material. Paper making technology generally involves manufacture of chemical or semi-chemical pulp by digestion of raw material, e.g., wood, in acid or alkaline solutions to separate the cellulose from the lignin. With the enormous volumes of paper discarded as waste, it has become increasingly important to recycle and utilize waste paper. Many suggestions have been made for the use of waste paper and considerable amounts of waste paper is recycled. Therefore, one benefit of the invention is that it provides another way of using waste paper including newspaper stock which would otherwise need to be disposed of at significant energy cost.

According to the invention, the paper pulp slurry starting material is at least partially dewatered to increase its dry fiber weight. Typically, the paper pulp slurry has a large volume of water eg about 95 to about 98% by weight based on the weight of water and dry fiber, much of which is desirably removed, for example, by means of an extraction screw press. Alternatively, a high pressure manual batch press may also be used to partially dewater the paper pulp. Normally dewatering is to about 60 to 90% by weight water or about 10 to about 40% by weight dry fiber.

After partial dewatering, the paper pulp mass is then processed to form nodules. This is accomplished using an externally heated nodulizer drum. In a preferred embodiment, an enclosure in the form of an inclined metal drum is placed on an inclined base and over a gas burner which can be used to apply heat to the exterior of the drum, which in turn also heats the interior surface. Suitable drive means may be provided to rotate the drum on castors. A removable entry door or cover is provided at the upper end of the inclined drum through which the dewatered paper pulp may be introduced. Flights, fingers, or baffles may be arranged on the interior surface of the drum so that paper pulp will be picked up as it passes through the inclined rotating drum and impacted against the hot interior surface. Tumbling of the paper pulp in this fashion results in production of discreet nodules which develops a hard skin or shell and become more firm with increasing dwell time in the heated rotating drum. Impacting the nodules on the heated interior surface of the drum causes a hardened skin to be formed on the nodules and the hard skin permits the nodules to be handled without destroying or impairing their physical character.

Nodulizing produces a product of about 55 to 85% water or about 15 to 45% dry fiber, preferably 70 to 85% water and 15 to 30% dry fiber. The nodules are generally spherical in shape and have a major dimension of from about 0.3 to about 1 inch, preferably about 0.4 to about 0.8 in inch. By a "major dimension" as used herein there is meant the longest dimension of a measured nodule. After the nodules are formed, they are removed from the drum and dried substantially without dimension change to further increase the dry fiber weight, as desired, preferably to a moisture content of less than 10% by weight or fiber content of 90% or more. Dried particles have a bulk density of about 10 to 15 lbs/cu.ft. preferably 11.5 to 12.5 lbs/cu.ft. Void free solids density is about 60-64 lbs/cu.ft.

By the method of the present invention, it is also possible to provide the paper pulp with additives to impart various desired properties to the nodules produced as described above. For example, prior to tumbling, and during the partial dewatering step, it may be desirable to introduce such additives as color pigments, fire retardant chemicals, insecticides, insect repellents and/or odor concealing chemicals, which may be mixed with the paper pulp in a high attrition mixer prior to nodulizing the pulpy mass. In this way, the resulting nodules will possess the properties imparted by the additive.

It has been determined that as the paper pulp is tumbled, it breaks into smaller units, the surface of which becomes heated and smooth i.e. free of protruding fibers and fibrils by contact with the interior surface of the rotating drum. Stated another way, during tumbling the pulp breaks into smaller and smaller nodules and, because of its contact with the heated surface, a hydrogen bond develops between the outer cellulosic fibers resulting in the formation of a nodule having a smooth, rounded appearance much like that of a river rock and a skin sufficiently hard to resist crumbling and breakage even as formed in the nodulizer.

The dried cellulose nodules produced by the method of the invention may be packed and bagged in suitable quantities for transportation and delivery to end users.

Nodules of various sizes may be produced ranging in size from undersized small rice grains to oversized particles the size of baseballs. The undersized are generally repulped or may be used for kitty litter and the oversized recycled with or without breaking to the nodulizer to reduce size. Generally at least 75 and more usually 90% or more of the particles are of a size suitable for animal bedding. Very little are kitty litter sized making the process suited to animal bedding manufacture but not kitty litter manufacture except as a means of disposal of undersized particles.

Figure 1:
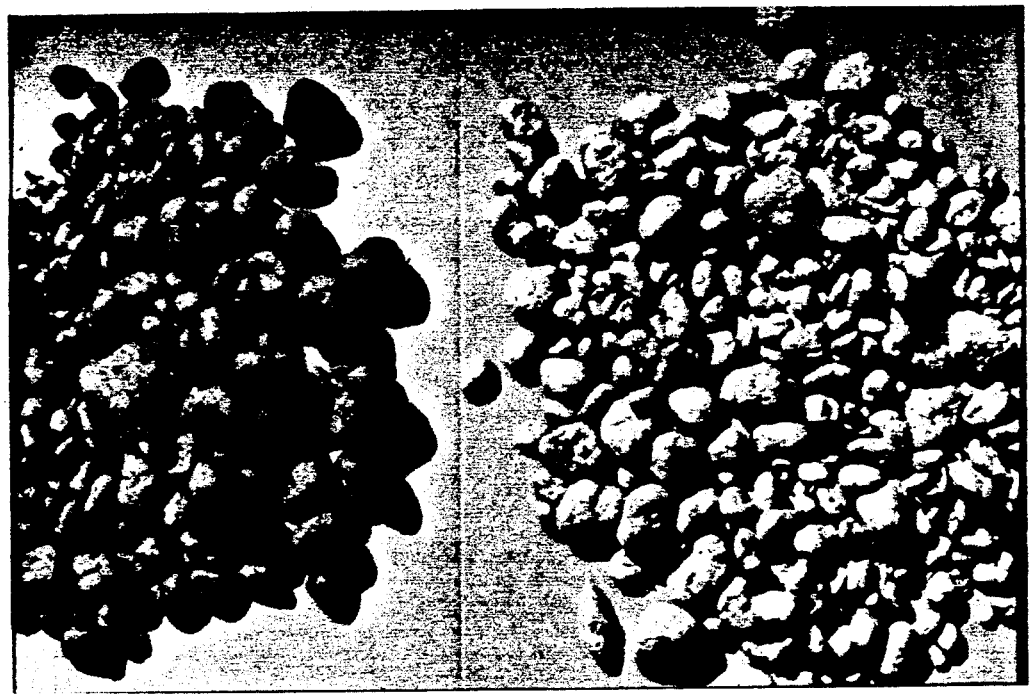
FIG. 1 shows the nodules produced according to the invention as they leave the nodulizer (wet) and after drying (dry) showing essentially no reduction in dimension. The size shown is about 90% of actual.
Figure 2:
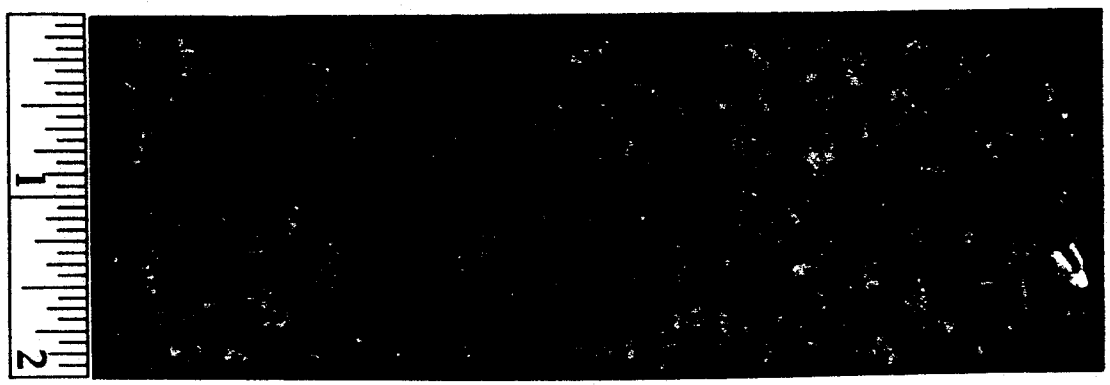
FIG. 2 shows dry nodules of actual size produced according to the invention.

FIG. 1 and 2 show nodules typically produced by the invention. FIGS. 3 and 4 show the product of other processes for kitty litter production. Dimensions are significantly different, with the kitty litter product having little or no particles of a size suitable for animal bedding. When subjectively measured for hardness using a manual pointed probe, the kitty litter products were substantially harder than the nodules formed in accordance with this invention. The same was true even when the kitty litter sized discards of the invention were tested for softness. The flat kitty particles shown in FIG. 3 were the hardest. On a relative basis the nodules of this invention are substantially less dense than the kitty litter products shown in FIG. 3 and 4.

When thoroughly dried (90% or more), the nodules are very lightweight yet have a hardened but moisture permeable outer surface which renders the nodules resistant to crushing under the weight of an animal. They are however resilient and serve as a cushioning bedding of therapeutic value for animals such as horses recovering from hoof and leg damage.

Unlike cellulose in the form of paper or loose wool-like material, the nodules produced by the present method may be easily handled by screw conveyor, belt conveyor, blow pipe, bucket elevator, or other traditional means of handling granular materials. This ability of the nodules to be easily handled further adds to their versatility and enables the nodules to be used for a range of uses not practical with other forms of cellulose, e.g., paper, fibers or wool.

As a general example of the practice of the method of the invention, waste paper, such as discarded waste newspapers, is introduced into a container together with a large volume of water. The container is provided with an agitator to mix the paper with the water. The material may be conveniently pulped to a consistency of approximately 2–5% preferably 4% by weight dry fiber weight and 95 to 98% preferably 96% by weight water. The mass is amorphous after the pulp is produced, pumped to a dewatering device or a series of dewatering devices, which may comprise a side hill screen, a screw extractor, a twin wire press or plain roller press, all of which are well known for this purpose. The paper pulp is thus partially dewatered, generally to 10% to 40% dry fiber weight or 60 to 90% water. In this still amorphous form and consistency, additives may be combined with the pulp, as described above by, for example, a high attrition mixing process.

The resulting paper pulp mixture with or without the additives is then subjected to nodulizing, in a nodulizing drum as described above which preferably comprises an inclined rotating externally heated cylinder advantageously equipped with flights, fingers, or baffles provided at he interior surface or lifting bars. The pulp is processed continuously by moving it through the cylinder. While being rotated within the cylinder, it is lifted by the flights, baffles, etc., and dropped onto the hot, rotating cylindrical surface repeatedly until the nodular shape is formed.

Nodules of various size may be produced depending upon the consistency or moisture level of the pulp introduced at the time of introduction to the nodulizer, the length or dwell time of the pulp in the nodulizer and speed and diameter of the cylindrical drum. The size of the nodules may also be affected by the amount of high attrition mixing or the crumbling the material experiences prior to its introduction to the nodulizer.

The nodules are removed from the nodulizer, or exit at the lower end of it if tumbled on a continuous basis, after the nodules have been formed. The nodules may still contain a good deal of retained moisture eg. 55 to 80% by weight water or 20 to 45% preferably by weight dry fiber. The exact consistency required to form the nodules may be varied but it is generally desirable to have a consistency of about 25 to 45% dry fiber weight as the nodules leave the tumble dryer.

The final step in the process is to dry the nodules to the desired dryness for packing and shipping. Preferably the nodules are air dried by passing warm air through and around the nodules in any convenient manner. For example, the nodules may be dried in a batch process by blowing air through a container, or on a continuous basis by conveying the nodules on a mesh conveyor in the presence of a warm, dry air stream. Another drying technique is by conveying the nodules into a fluidized bed of previously introduced nodules which, when sufficiently dry are conveyed by the drying air-stream to a collection point for packaging. The desired final dryness may depend on the application to which the nodules will be subjected but, in general, a final nodule dryness of 80% to 95% preferably 90 to 98% dry fiber weight is believed to be satisfactory. In the dried stage nodules can absorb water to a level of 4 or more times their weight without loss of structural integrity. This is becasue of the porous absorbent core is surrounded by a moisture permeable yet hard skin which maintains a high overall cohesive strength.

The following is a example of the module forming, in one step, dust free nodules free of protruding fiber and fibrils and having a smooth tough skin are formed.

EXAMPLE

There was provided a paper pulp of 3% by weight solids and 97% water (3% consistency). The pulp was formed form old newspapers and was grey in color.

This pulp was passed through a first screw press to partially dewater the pulp. There was formed after two passes and amorphous pulp dewatered to a solids content of 11.1% by weight (88.9% water).

The paper pulp was then pressed in a hand press to remove more moisture to a solids content of 20.4% by weight (79.6% water). This left a relatively amorphous mass of fiber and water.

The dewatered mass was then passed to an externally heated inclined rotary drum for a residence time of 15 minutes in which nodules having a smooth hard skin free of exposed fibers and fibrils were formed. The nodules had a solids content of 20.9% by weight (79.1% water).

The nodules as formed were then passed to a heated air dryer where they were dried by passage of hot air thereover to a solids content of 93.5% by weight (6.5% water). The nodules had a bulk density of 12.1 lbs./cu. ft. and a generally spheroidal shape as opposed to flat shape having major diameters from 0.3 to 1 inch with most of the nodules ie 75% or more in the range of 0.3 to 0.8 inch.

It is apparent from the foregoing that various changes and modifications may be made without departing from the spirit of the invention.

What is claimed is:

1. Nodules prepared from paper fibers comprising nodules having a bulk density of from about 10 to about 15 lbs per cu. ft. and formed by:
    (a) providing a paper pulp slurry containing at least about 95% by weight water and about 5% by weight fiber;
    (b) partially dewatering said paper pulp slurry to form a partially dewatered paper pulp having a dry fiber weight of from about 10 to about 40 percent dry paper fiber and a moisture content from about 60 to about 90 percent by weight;
    (c) nodulizing said partially dewatered paper pulp in an inclined rotating externally heated enclosure to form within said inclined enclosure and directly from said partially dewatered paper pulp a plurality of discrete nodules having smooth surface and a skin sufficiently hard to resist breakage under the weight of an animal, the majority of said nodules having the major dimension of from 0.3 to about 1 inch, said nodulizing occurring with a further reduction in moisture content and;
    (d) further drying said nodules having the hard skin and smooth surface to provide dry nodules of a bulk density of about 10 to about 15 lbs./ cu. ft. substantially without change in nodule major dimension; said nodules formed for use as animal bedding.

2. Nodules as prepared in claim 1 in which the nodules prior to drying have a water content of from about 55% to about 85% by weight and a dry fiber content of from about 15% to about 45% by weight.

3. Nodules prepared according to claim 1 wherein tumbling of said partially dewatered pulp and formation of a hard skin and smooth surface on said nodules is enhanced by contact with means extending from the interior surface of said container which pick up the nodules being formed and impacting the forming nodules against the heated interior surface of the drum as the container rotates.

4. Nodules prepared according to claim 1 further comprising mixing an additive with the partially dewatered paper pulp.

5. Nodules prepared according to claim 4 wherein said paper pulp is mixed with said additive in a high attrition mixer.

6. Nodules prepared according to claim 5 wherein said additive comprises at least one of the group consisting of a color pigment, a fire retardant chemical, an insecticide, insect repellant, a binder, and an odor concealing chemical.

7. Nodules formed from paper pulp by the steps of:
    (a) forming from waste paper a paper pulp slurry containing of about 95 to 98% by weight water and about 5 to about 2% by weight paper fiber;
    (b) partially dewatering said paper pulp slurry in a press to form a partially dewatered paper pulp containing about 10 to about 25% by weight dry paper fiber and a water content of about 90 to 75% by weight;

(c) tumbling, said partially dewatered paper pulp in an inclined rotating externally heated drum to form within said inclined drum and directly from said partially dewatered paper pulp a plurality of discrete nodules having smooth surface and a skin sufficiently hard to resist breakage under the weight of an animal and comprising nodules of a dry fiber content of from 15 to 30% by weight and moisture content of from about 70% to about 85% by weight water wherein at least 75% of the nodules have a major dimension of about 0.3 to a about 0.8 inch and;

(d) further drying said nodules having the hard skin and smooth surface, substantially without change in major dimension to from dried nodules of a bulk density of from about 11.5 to 12.5 lb./cu.ft. and a moisture content of less than about 10% by weight of the nodule, said nodules formed for use as animal bedding.

8. Nodules prepared according to claim 7 wherein tumbling of said partially dewatered pulp and formation of a hard skin and smooth surface on said nodules is enhanced by contact with means extending form the interior surface of said container which pick up the nodules being formed and impacting the forming nodules against the heated interior surface of the drum as the container rotates.

9. Nodules prepared according to claim 7 further comprising mixing an additive with the partially dewatered paper pulp.

10. Nodules prepared according to claim 8 further comprising mixing an additive with the partially dewatered paper pulp.

11. Nodules formed of paper fibers formed by a method comprising:

(a) providing from waste paper a paper pulp slurry, of about 4% by weight fiber and about 96% by weight water;

(b) partially dewatering said paper pulp slurry in at least one press to form a partially dewatered paper pulp having a dry fiber weight to from about 15% to about 40% dry paper fiber and a moisture content of about 60 to about 85% of the mass;

(c) adding at least one additive to the partially dewatered paper pulp by high attrition mixing;

(d) tumbling said partially dewatered additive containing paper pulp in an inclined, rotating, externally heated enclosure to form within the enclosure and directly from the partially dewatered paper pulp a plurality of discrete, smooth surfaced nodules having a hard skin in which at least 75% of said nodules having a major dimension between about 0.3 and about 0.8 inch, the formation of said nodules including lifting nodules and impacting nodules on the interior surface of the enclosure and;

(e) further drying said nodules substantially without change of major dimension by passing a warm, dry air stream through the nodules whereby animal bedding material in the form of cellulosic nodules having a skin sufficiently hard to resist crushing and breaking under the weigh of an animal and a bulk density of from 11.5 to about 12.5 lb./cu.ft. and moisture content of less than 10% by weight of the nodules is produced, said nodules formed for use as animal bedding.

12. Nodules prepared as claimed in claim 11 wherein said additive comprises at least one of the group consisting of a color pigment, a fire retardant chemical, an insecticide, insect repellant, a binder, and an odor concealing chemical.

* * * * *

UNITED STATES PATENT AND TRADEMARK OFFICE
CERTIFICATE OF CORRECTION

PATENT NO. : 5,209,186
DATED : May 11, 1993
INVENTOR(S) : Kenneth M. Dewing

It is certified that error appears in the above-indentified patent and that said Letters Patent is hereby corrected as shown below:

Title page, col. 1, line 1, item [54] Title, change "MODE" to MADE --.

In the drawings, sheet 1 and 2 should be replaced with the attached sheets.

The title page, should be deleted to appear as per attached title page.

Signed and Sealed this

Fifth Day of April, 1994

BRUCE LEHMAN

*Attest:*

*Attesting Officer*  *Commissioner of Patents and Trademarks*

United States Patent [19]

Dewing

[11] Patent Number: 5,209,186
[45] Date of Patent: May 11, 1993

[54] ANIMAL BEDDING NODULES MODE FROM PAPER PULP AND METHOD OF MAKING THE SAME

[75] Inventor: Kenneth M. Dewing, Porterville, Calif.

[73] Assignee: Endurequest Corporation, Porterville, Calif.

[21] Appl. No.: 832,782

[22] Filed: Feb. 7, 1992

[51] Int. Cl.⁵ ............................................ A01K 1/015
[52] U.S. Cl. .................................. 119/172; 264/118; 264/140
[58] Field of Search ................ 119/171, 172, 173; 264/118, 140, 109, 86, 117

[56] References Cited

U.S. PATENT DOCUMENTS 4,560,527 12/1985 Harke et al. .................... 119/172
4,619,862 10/1986 Sokolowski et al. ............ 119/172

Primary Examiner—John G. Weiss
Attorney, Agent, or Firm—Christie, Parker & Hale

[57] ABSTRACT

Described herein is a method of producing nodules from paper pulp. The method includes partially dewatering the paper pulp and tumbling the partially dewatered pulp in an externally heated enclosure until the nodules are formed. Additives may be added to the pulp prior to tumbling.

12 Claims, 2 Drawing Sheets

WET        DRY

UNITED STATES PATENT AND TRADEMARK OFFICE
CERTIFICATE OF CORRECTION

PATENT NO.  : 5,209,186
DATED       : May 11, 1993
INVENTOR(S) : Kenneth M. Dewing It is certified that error appears in the above-identified patent and that said Letters Patent is hereby corrected as shown below:

```
Column 1, line 46, after "nodules" change "f" to -- of --.
Column 1, line 48, after "broadly" delete "refer".
Column 1, line 58, change "form" to -- from --.
Column 1, line 62, change "discreet" to -- discrete --.
Column 1, line 62, change "ie" to -- ,i.e., --.

Column 2, line 1, change "12.5 lbs. 1" to -- 12.5 lbs/1 --.
Column 2, line 17, change "then" to -- them --.
Column 2, line 21, change "discreet" to -- discrete --.
Column 2, line 26, change "DRAWING" to -- DRAWINGS --.
Column 2, line 43, change "the preparing" to -- preparation
          of --.
Column 2, line 67, change "eg" to -- ,e.g., --.

Column 3, line 5, before "about" delete "to".
Column 3, line 23, change "discreet" to -- discrete --.
Column 3, line 35, after "0.8" delete "in".
Column 3, line 59, change "i.e." to -- ,i.e., --.

Column 4, line 15, change "FIG." to -- FIGS. --.
Column 4, line 28, change "FIG." to -- FIGS. --.
```

UNITED STATES PATENT AND TRADEMARK OFFICE
CERTIFICATE OF CORRECTION

PATENT NO. : 5,209,186

DATED : May 11, 1993

INVENTOR(S) : Kenneth M. Dewing

It is certified that error appears in the above-identified patent and that said Letters Patent is hereby corrected as shown below:

```
Column 4, line 68, before "interior" change "he" to
          -- the --.

Column 5, line 17, change "eg." to -- , e.g., --.
Column 5, line 44, before "example" change "a" to -- an --.
Column 5, line 51, change "form" to -- from --.

Column 6, line 4, change "ie" to -- , i.e., --.

Column 7, line 12, before "about" delete "a".
Column 7, line 16, after "dimension" delete "to".
Column 7, line 25, change "form" to -- from --.

Column 8, line 6, after "weight" delete "to".
Column 8, line 27, change "weigh" to -- weight --.
Column 8, line 33, change "group" to -- groups --.
```

WET                    DRY